United States Patent [19]

Moser et al.

[11] Patent Number: 5,126,443
[45] Date of Patent: Jun. 30, 1992

[54] PHTHALOCYANINE AZO DYES CONTAINING 5-CYANO-DICHLOROPYRIMIDYL GROUP

[75] Inventors: Helmut A. Moser, Oberwil, Switzerland; Roland Wald, Huningue, France

[73] Assignee: Sandoz Ltd., Basel, Switzerland

[21] Appl. No.: 585,531

[22] Filed: Sep. 19, 1990

Related U.S. Application Data

[63] Continuation-in-part of Ser. No. 411,945, Sep. 25, 1989, abandoned.

[30] Foreign Application Priority Data

Sep. 23, 1988 [DE] Fed. Rep. of Germany ....... 3832364

[51] Int. Cl.$^5$ .................... C09B 62/51; C07D 487/22
[52] U.S. Cl. ........................................... 540/125
[58] Field of Search ........................................ 540/125

[56] References Cited

U.S. PATENT DOCUMENTS

| | | | |
|---|---|---|---|
| 4,033,980 | 7/1977 | Meininger et al. | 540/125 |
| 4,246,174 | 1/1981 | Groll | 540/125 |
| 4,280,956 | 7/1981 | Schreiner et al. | 540/125 |
| 4,396,549 | 8/1983 | Nakamatsu et al. | 540/125 |
| 4,418,015 | 11/1983 | Schreiner et al. | 540/125 |
| 4,648,993 | 3/1987 | Colberg et al. | 540/125 |
| 4,745,187 | 5/1988 | Springer | 540/125 |
| 4,845,209 | 7/1989 | Adam | 540/132 |

FOREIGN PATENT DOCUMENTS

| | | |
|---|---|---|
| 3006013 | 8/1981 | Fed. Rep. of Germany. |
| 3403662 | 8/1985 | Fed. Rep. of Germany ...... 540/125 |
| 3503747 | 8/1986 | Fed. Rep. of Germany ...... 540/125 |
| 3110260 | 5/1988 | Japan ................................. 540/125 |
| 917780 | 2/1963 | United Kingdom. |
| 948969 | 2/1964 | United Kingdom. |
| 952619 | 3/1964 | United Kingdom. |
| 2200364 | 8/1988 | United Kingdom. |

*Primary Examiner*—Cecilia Shen
*Attorney, Agent, or Firm*—Gerald D. Sharkin; Richard E. Vila; Melvyn M. Kassenoff

[57] ABSTRACT

Compounds of the formulae

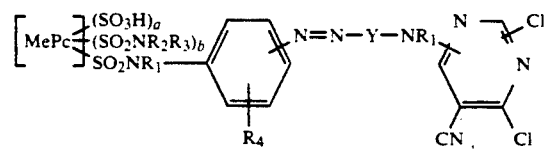

and

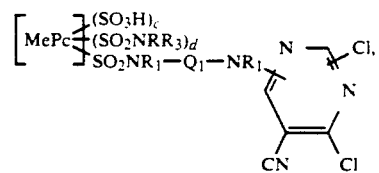

salts thereof,
and mixtures of such compounds or salts,
wherein Me, Pc, $Q_1$, $R_1$, $R_2$, $R_3$, Y, a, b, c and d as defined,
useful as fiber-reactive dyes for dyeing or printing hydroxy group- and nitrogen-containing organic substrates, for example, textile material comprising cotton, the obtained dyeings and prints having good all-round fastnesses, such as good light fastness.

21 Claims, No Drawings

PHTHALOCYANINE AZO DYES CONTAINING 5-CYANO-DICHLOROPYRIMIDYL GROUP

This is a continuation-in-part of application Ser. No. 07/411,945, filed Sep. 25, 1989 and now abandoned.

The invention relates to phthalocyanine compounds which contain a heterocyclic fibre-reactive group, a process for their production and their use as fibre-reactive dyes in dyeing and printing processes.

More particularly, this invention provides comparison of formula Ia

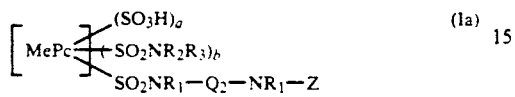

in free acid or salt form and mixtures thereof, in which
Pc is the phthalocyanine radical,
Me is Cu, Ni, Co, Fe or Al,
a is 1, 2 or 3, and
b is 0, 1 or 2, provided that the sum of a and b is a maximum of 3;
each $R_2$ and $R_3$ is independently hydrogen or $C_{1-6}$alkyl, or $-NR_2R_3$ is a five- or six-membered cyclic ring system or a five- or six-membered cyclic ring system which contains one further oxygen or nitrogen atom,
each $R_1$ is independently hydrogen, unsubstituted $C_{1-4}$alkyl or $C_{1-4}$alkyl monosubstituted by hydroxy, halogen, $-SO_3H$, $-OSO_3H$ or $-COOH$,
Z is

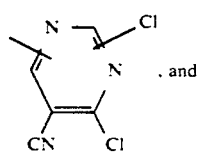

$Q_2$ is

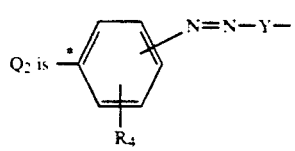

in which the * denotes the carbon atom attached to $-SO_2NR_1-$,
$R_4$ is hydrogen, halogen, hydroxy, $C_{1-4}$alkyl, $C_{1-4}$alkoxy, $-COOH$ or $-SO_3H$; and
Y is

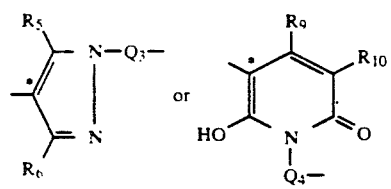

is which the * indicates the coupling position to which $-N=N-$ is attached,
$R_5$ is $C_{1-4}$alkyl or $-COR_8$,
$R_8$ is $-OH$, $-OC_{1-4}$alkyl or $-NH_2$,
$Q_3$ is a divalent bridging group,
$R_9$ is hydrogen, $C_{1-4}$alkyl, $C_{5-6}$cycloalkyl, phenyl or phenyl-($C_{1-4}$alkyl) in which each phenyl ring is unsubstituted or substituted by one to three substituents selected from $C_{1-4}$alkyl, $C_{1-4}$alkoxy, halogen, $-COOH$ and $-SO_3H$, $-COR_8$, $-(CH_2)_n-SO_3H$, $-(CH_2)_n-OSO_3H$ or $-(CH_2)_n-COR_8$ in which $R_8$ is as defined above and n is 1, 2, 3 or 4,
$R_{10}$ is hydrogen, $-CN$, $-SO_3H$, $-COR_8$, $C_{1-4}$alkyl, $C_{1-4}$alkyl monosubstituted by $-OH$, halogen, $-CN$, $C_{1-4}$alkoxy,

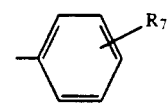

$-SO_3H$, $-OSO_3H$ or $-NH_2$, $-SO_2NH_2$,

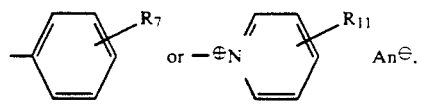

wherein $R_8$ is as defined above,
each $R_7$ is hydrogen, halogen, $C_{1-4}$alkyl, $C_{1-4}$alkoxy, $-COOH$ or $-SO_3H$,
$R_{11}$ is hydrogen, $C_{1-4}$alkyl or $C_{2-4}$hydroxyalkyl, and An⊖ is a non-chromophoric anion; and
$Q_4$ is $C_{2-6}$alkylene, monohydroxy-substituted $C_{3-6}$alkylene or $C_{2-6}$alkylene which is interrupted by one radical selected from $-O-$ and $-NR_1-$,

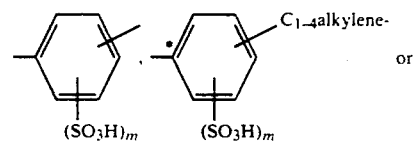

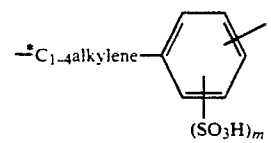

in which the $C_{1-4}$alkylene radicals and the free valences in the second and third structural formulae are most preferably para to each other, or $-Q_4-NR_1-$ is

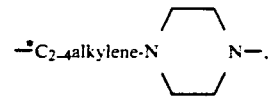

in which m is 0 to 1, and the * denotes the carbon atoms attached to the nitrogen atom of the pyridone ring.

Furthermore, this invention provides compounds of formula Ib

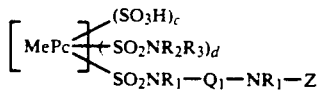 (Ib)

in free acid or salt form and mixtures thereof, in which
c is 1 or 2, and
d is 1 or 2,
provided that the sum of c and d is a maximum of 3;
R is $C_{1-6}$-alkyl and
$R_3$ is hydrogen or $C_{1-6}$alkyl or
—$NRR_3$ is a five- or six-membered cyclic ring system or a five- or six-membered cyclic ring system which contains one further oxygen or nitrogen atom,
$Q_1$ is $C_{2-6}$alkylene, monohydroxy-substituted $C_{3-6}$alkylene or $C_{2-6}$alkylene which is interrupted by one radical selected from —O— and —$NR_1$—,

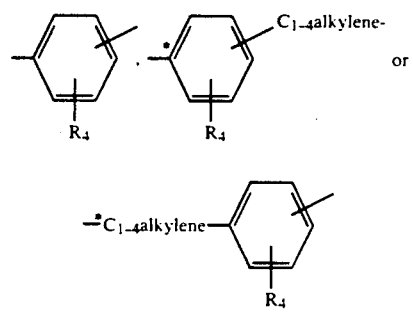

in which the * denotes the carbon atom attached to —$SO_2NR_1$—, or
—$SO_2NR_1$—$Q_1$—$NR_1$— is

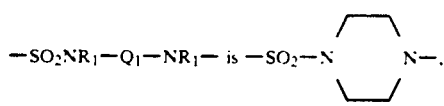

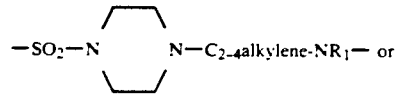

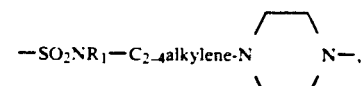

and Pc, Me, $R_1$, $R_4$ and Z are as defined above.

In the specification, any alkyl or alkylene group capable of being linear or branched is linear or branched unless indicated to the contrary. In a hydroxy-substituted alkyl or alkylene group which is bonded to nitrogen, the hydroxy group is preferably attached to a carbon atom which is not directly bonded to nitrogen.

Preferably, the total number of anionic groups and, more preferably, the number of sulpho groups exceeds the number of cationic groups, if any, by at least one.

Preferably, none of the four units of the phthalocyanine ring system contains more than one substituent.

Halogen is fluorine, chlorine or bromine, preferably chlorine or bromine and especially chlorine.

Due to the non-selectivity of the reaction of 5-cyano-2,4,6-trichloropyrimidine with the —$NHR_1$ group of the chromophore which occurs by displacement of either of the chloro atoms in the 2- and 6-positions of the pyrimidine ring, the position in which Z is attached is not fixed.

Preferably the compounds of formulae Ia and Ib are isomeric mixtures in which the positions of the substituents on the phthalocyanine radical and the position in which Z is attached are not fixed.

Preferably, Me is $Me_1$, where $Me_1$ is copper or nickel.

Preferably, $R_1$ is hydrogen, $C_{1-2}$alkyl or by hydroxy, —$SO_3H$, —$OSO_3H$ or —COOH, of which hydroxy is most preferred.

Preferably, each $R_1$ is $R_{1a}$, where each $R_{1a}$ is independently hydrogen, methyl, ethyl, 2-hydroxyethyl, —$(CH_2)_pSO_3H$, —$(CH_2)_pOSO_3H$ or —$(CH_2)_qCOOH$, in which p is 1 or 2 and q is 1, 2 or 3. More preferably each $R_1$ is $R_{1b}$, where each $R_{1b}$ is independently hydrogen, methyl, ethyl or 2-hydroxyethyl and most preferably each $R_1$ is $R_{1c}$, where each $R_{1c}$ is independently hydrogen or methyl.

Preferably, each $R_2$ and $R_3$ is $R_{2a}$ and $R_{3a}$, where each $R_{2a}$ and $R_{3a}$ is independently hydrogen or $C_{1-4}$alkyl, or $R_{2a}$ and $R_{3a}$, together with the nitrogen atom to which they are attached, form a pyrrolidine, piperidine, morpholine or piperazine ring. More preferably each $R_2$ and $R_3$ is $R_{2b}$ and $R_{3b}$, where each $R_{2b}$ and $R_{3b}$ is independently hydrogen, methyl or ethyl.

Preferably R is $R_a$, where $R_a$ is $C_{1-4}$alkyl; more preferably R is $R_b$, where $R_b$ is methyl or ethyl; or —$N_aR_{3a}$ is a pyrrolidine, piperidine, morpholine or piperazine ring.

Any $R_4$ is preferably $R_{4a}$, where $R_{4a}$ is hydrogen, methyl, methoxy, —COOH or —$SO_3H$. More preferably, $R_4$ is $R_{4b}$ is hydrogen, —COOH or —$SO_3H$.

Preferably, $Q_1$ is $Q_{1a}$, where $Q_{1a}$ is —$C_{2-3}$alkylene, monohydroxysubstituted —$C_{3-4}$alkylene-, —$C_{2-3}$alkylene—O—$C_{2-3}$alkylene-, —$C_{2-3}$-alkylene-$NR_{1b}$—$C_{2-3}$alkylene-,

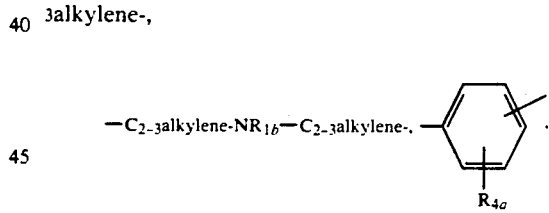

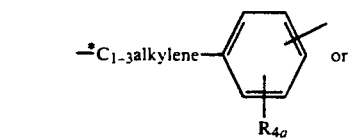

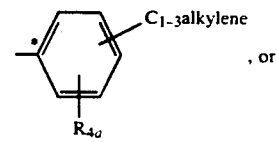

—$NR_1$—$Q_{1a}$—$NR_1$— is

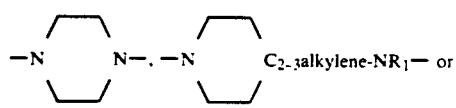

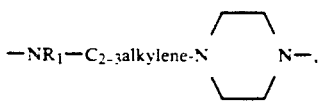

in which the * denotes the carbon atoms attached to —SO₂NR₁—.

More preferably Q₁ is Q₁ᵦ, where Q₁ᵦ is —C₂₋₃alkylene-, monohydroxy-substituted —C₃₋₄alkylene-,

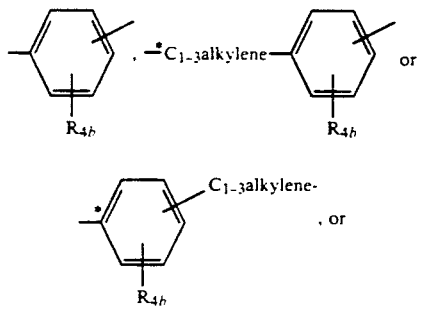

or —SO₂—NR₁—Q₁ᵦ—NR₁— is

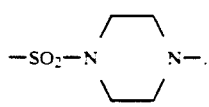

Even more preferably Q₁ is Q₁ᵧ, where Q₁ᵧ is —C₂₋₃alkylene-, monohydroxy-substituted

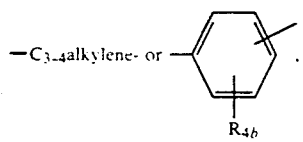

or —SO₂NR₁—Q₁ᵧ—NR₁— is

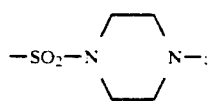

most preferably Q₁ is Q₁ᵨ, where Q₁ᵨ is —C₂₋₃alkylene- or monohydroxy-substituted —C₃₋₄alkylene-.

Preferably R₅ —OH.

Preferably R₆ is R₆ₐ, where R₆ₐ is methyl, —COOH or —CONH₂.

Preferably R₇ is R₇ₐ, where R₇ₐ is hydrogen, chlorine, methyl, methoxy, —COOH or —SO₃H.

Preferably R₈ is R₈ₐ, where R₈ₐ is —OH or —NH₂.

Preferably Q₃ is Q₃ₐ, where Q₃ₐ is

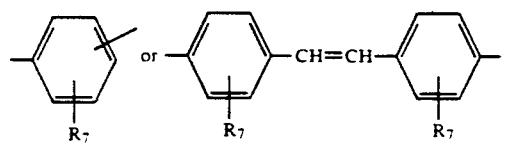

More preferably Q₃ is Q₃ᵦ, where Q₃ᵦ is

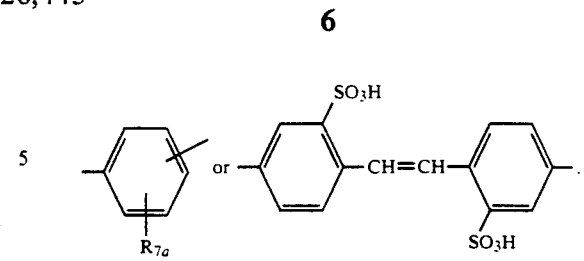

Preferably R₉ is R₉ₐ, where R₉ₐ is hydrogen, methyl, ethyl, phenyl, —COR₈ₐ, —CH₂SO₃H or —CH₂OSO₃H. More preferably R₉ is R₉ᵦ, where R₉ᵦ is methyl or ethyl, most preferably methyl.

Preferably R₁₀ is R₁₀ₐ, where R₁₀ₐ is hydrogen, —CN, —SO₃H, —COR₈ₐ or —CH₂SO₃H. More preferably R₁₀ is R₁₀ᵦ, where R₁₀ᵦ is hydrogen or —CONH₂.

Preferably Q₄ is Q₄ₐ, where Q₄ₐ is —C₂₋₄alkylene-, monohydroxy-substituted —C₃₋₄alkylene-,

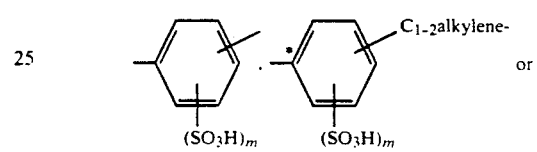

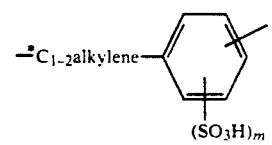

—Q₄ₐ—NR₁— is

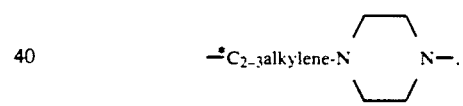

in which the * denotes the carbon atoms attached to the nitrogen atom of the pyridone ring.

Y is preferably Yₐ, more preferably Yᵦ, where Yₐ and Yᵦ are as defined below.

Preferably Q₂ is Q₂ₐ, where Q₂ₐ is

Preferably Q₂ is Q₂ₐ, where Q₂ₐ is 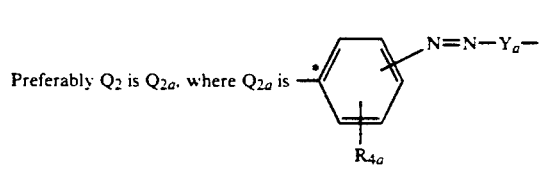

in which Yₐ is

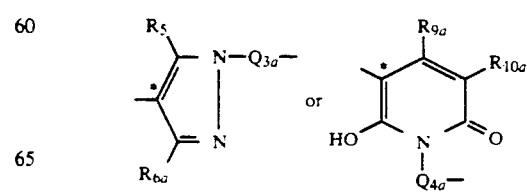

More preferably Q₂ is Q₂ᵦ, where Q₂ᵦ is

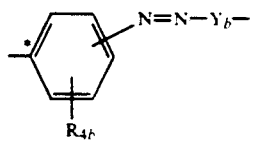

in which $Y_b$ is

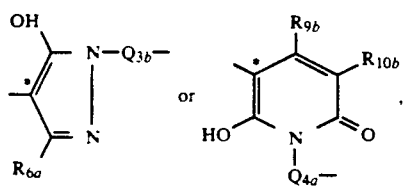

in which $R_{9b}$ is most preferably methyl.

In any significance of $Q_1$, $Q_{1a}$–$Q_{1c}$, $Q_2$, $Q_{2a}$, $Q_{2b}$, $Q_3$, $Q_{3a}$, $Q_{3b}$, $Q_4$ and $Q_{4a}$ having a phenylene or substituted phenylene radical, unless otherwise indicated, the free valences (or the free valence and the radical containing the free valence) are preferably meta or para to each other.

Preferred compounds of formula Ia are those of formula Ia' and mixtures thereof

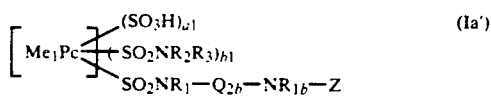 (Ia')

which compounds or mixtures are in free acid or salt form, in which the symbols are as defined above; and $a_1$ is 2 or 3, and $b_1$ is 0 or 1, provided that the sum of $a_1$ and $b_1$ is a maximum of 3.

More preferred compounds of formula Ia' are those in which $a_1$ is 2 or 3 and $b_1$ is zero;

$R_{9b}$ in $Q_{2b}$ is methyl; and $R_{1b}$ is hydrogen or methyl.

Preferred compounds of formula Ib are those of formula Ib' and mixtures thereof

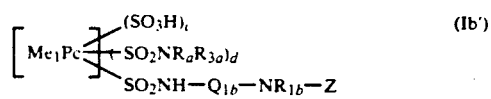 (Ib')

which compounds or mixtures are in free acid or salt form, in which the symbols are as defined above.

More preferred compounds of formula Ib' are those in which d is 1;

$R_a$ is $R_b$ and $R_{3a}$ is $R_{3b}$;

$R_{1b}$ is hydrogen or methyl; and $Q_{1b}$ is $q_{1c}$ and most preferably $Q_{1d}$.

Even more preferred compounds of formula Ib' are those wherein $Q_{1b}$ is $Q_{1d}$, and $Me_1$ is Cu.

When a compound of formula Ia or Ib is in salt form, the cation associated with the sulpho groups and any carboxy group is not critical and may be any one of those non-chromophoric cations conventional in the field of fibre-reactive dyes provided that the corresponding salts are water-soluble.

Examples of suitable cations are alkali metal ions and unsubstituted and substituted ammonium ions, for example lithium, sodium, potassium, ammonium, mono-, di-, tri- and tetra-methylammonium, triethylammonium and mono-, di- and tri-ethanolammonium.

Preferably the cations are selected from the alkali metal ions and ammonium, more preferably sodium.

In a compound of formula Ia or Ib the cations of the sulpho and any carboxy groups can be the same or different, e.g., they can also be a mixture of the above mentioned cations meaning that the compound of formula Ia or Ib can be in a mixed salt form.

The invention further provides a process for preparing a compound of formula Ia or Ib or a mixture of compounds of formula Ia or Ib, which comprises reacting a compound of formula IIa or IIb,

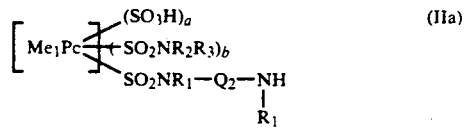 (IIa)

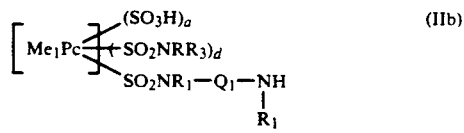 (IIb)

in which the symbols are as defined above, or a mixture of compounds of formula IIa or IIb with 5-cyano-2,4,6-trichloropyrimidine, in appropriate molar amounts, i.e., the molar ratio of the latter to the former is usually 1–1.3:1.

The reaction is suitably carried out at 0° to 40° C. and at pH 6.5 to 9. Water is normally used as the reaction medium, but an organic solvent such as acetone can be used as solvent for the 5-cyano-2,4,6-trichloropyrimidine.

The compounds of formulae Ia and Ib may be isolated in accordance with known methods, for example by conventional salting out with alkali metal salt, filtering and drying in vacuo at a slightly elevated temperature.

Depending on the reaction and isolation conditions, a compound of formula Ia or Ib is obtained in free acid or preferably salt form or even mixed salt form containing, for example, one or more of the above-mentioned cations. It may be converted from free acid form to a salt form or mixture of salt forms or vice versa of from one salt form to another by conventional means.

The starting compounds of formulae IIa and IIb are either known or may be prepared in accordance with known methods from known starting compounds.

The compounds of formulae Ia and Ib and mixtures of compounds of formula Ia or Ib are fibre-reactive dyes. They are suitable for dyeing or printing hydroxy group- or nitrogen-containing organic substrates. They can for example be used for dyeing or printing leather and fibres, filaments or textiles produced therefrom which comprise natural or synthetic polyamides or natural or regenerated cellulose material, e.g., cotton, viscose or rayon staple fibre, and preferably textile materials comprising cotton.

Methods for dyeing include dyebaths or printing pastes commonly used with fibre-reactive dyes. For example, cotton is preferably dyed by the exhaust process, for example from a long or short bath and at a temperature from 30° to 80° C.

Preferred compounds according to the invention are those which have good cold dyeing properties and may be used for cold-dyeing at temperatures of about 60°C.

The compounds according to the invention may be used per se or in combination with appropriate fibre-reactive dyes of the same class which possess comparable dyeing properties, e.g., all-round fastness properties, extent of ability to exhaust from the dyebath onto the fibre, etc. The combination dyeings obtained have fastness properties which are as good as that of dyeings made with an individual dye.

Good exhaust and fixation values are obtained with the compounds of formulae Ia and Ib. The unfixed part of the dye can be easily washed out. The dyeings and prints obtained have good light fastness. In addition, they have good washing fastness and wet fastness properties, for example to water, sea water and sweat, and have good resistance to oxidation caused by for example chlorine-containing water, hypochlorite bleaches, peroxide bleaches and perborate-containing detergents.

The following examples further serve to illustrate the invention. All parts and percentages are by weight and all temperatures are given in degrees centigrade unless indicated to the contrary.

In the examples, each symbol Z used in the formulae means a group

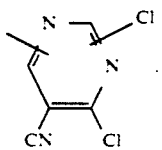

EXAMPLE 1

29.8 Parts of a copper phthalocyanine dyestuff base compound containing per molecule on average 2 sulphonic acid groups, 1 N,N-dimethylsulphamide group and 1 substituted phenylsulphamide group, produced by sulphochlorinating copper phthalocyanine and subsequently reacting with dimethylamine and 1,3-diaminobenzene, are dissolved in 200 parts of water at pH 6.5 to 7.0. 150 Parts of ice are added and a solution of 6.3 parts of 5-cyano-2,4,6-trichloropyrimidine in acetone (20% excess) is added as a single addition. The pH of the reaction mixture drops and is held at pH 7 to 7.5 for the duration of the reaction by the continuous addition of 20% soda solution. At the same time the reaction temperature is raised to and maintained at 20°. After 3 to 4 hours, the reaction is complete. The mixture is salted out with 45 parts of sodium chloride, and the dyestuff deposit obtained is filtered off under suction and dried at 35°. The dyestuff obtained is of formula Ia

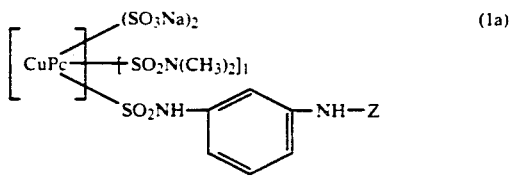

and dyes cellulose material, especially cotton, a brilliant turquoise shade. The dyeings have good light fastness and wet fastness properties.

EXAMPLE 2

By using, instead of the 29.8 parts of the copper phthalocyanine dyestuff base compound of Example 1, an equivalent amount of a nickel phthalocyanine dyestuff base compound having an average 2 sulphonic acid groups, 1 N,N-dimethylsulphamide group and 1 substituted phenylsulphamide group per molecule of dyestuff base compound (i.e. 29.6 parts), the nickel analogue of the dyestuff of formula Ia is obtained, which dyes cotton a blue-green shade and produces dyeings with good fastness properties.

EXAMPLES 3–10

Using a method analogous to that described in Examples 1 and 2, and starting with the appropriate starting compounds, the following compounds of formula IA (represented in free acid form)

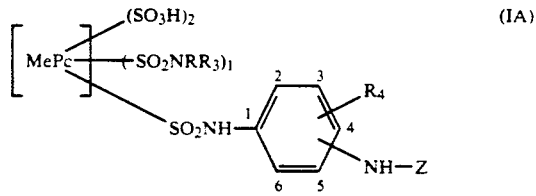

may be prepared in which the symbols are as defined in Table 1 below. The table gives the shade of dyeing on cotton for each example, in which bt is brilliant turquoise and bg is bluish green.

These cotton dyeings have good fastness properties.

TABLE 1

| | | Compounds of formula 1A | | | | |
| Ex. No. | Me | R | R₃ | R₄ (position in ring) | position of —NH— in ring | shade on cotton |
| --- | --- | --- | --- | --- | --- | --- |
| 3 | Cu | CH₃ | H | H | 3 | bt |
| 4 | Cu | C₂H₅ | C₂H₅ | H | 3 | bt |
| 5 | Cu | C₂H₅ | H | 4-SO₃H | 3 | bt |
| 6 | Cu | CH₃ | H | 2-COOH | 4 | bt |
| 7 | Cu | C₂H₅ | C₂H₅ | H | 4 | bt |
| 8 | Ni | CH₃ | H | H | 3 | bg |
| 9 | Ni | C₂H₅ | C₂H₅ | H | 4 | bg |
| 10 | Ni | C₂H₅ | H | 3-SO₃H | 4 | bg |

EXAMPLE 11

25.5 Parts of a nickel phthalocyanine dyestuff base compound containing on average 2.5 sulphonic acid groups and 1 substituted phenylsulphamide group per molecule, produced by sulphochlorinating nickel phthalocyanine and subsequently reacting with 1,3-diaminobenzene-4-sulphonic acid, are mixed by stirring with 1.8 parts of sodium nitrite in 150 parts of water. The solution is cooled to 0°–2° and is added drop-wise to a solution of 12 parts of 30% hydrochloric acid in 100 parts of ice/water. The diazonium salt suspension obtained is maintained at a temperature of 0°–5° and is passed into a solution consisting of 300 parts of ice/water and 5.9 parts of 1-(3-methylaminopropyl)-6-hydroxy-4-methyl-2-pyridone. During the coupling reaction, the pH is maintained at 9–9.5 by adding 20% sodium hydroxide solution. Following the method of Example 1, the resulting green solution is reacted with 5-cyano-2,4,6-trichloropyrimidine and the product is isolated. The dyestuff of formula 11a.

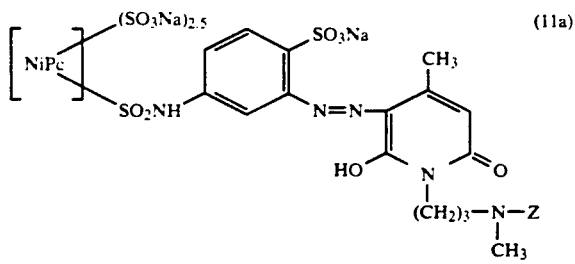

(11a)

is obtained. It dyes cellulose material, especially cotton, a brilliant green shade. These dyeings have good light fastness and excellent wet fastness properties.

EXAMPLES 12-50

Using a method analogous to that of Example 11 and using appropriate starting materials the following compounds of formulae IB and IC (represented in free acid form)

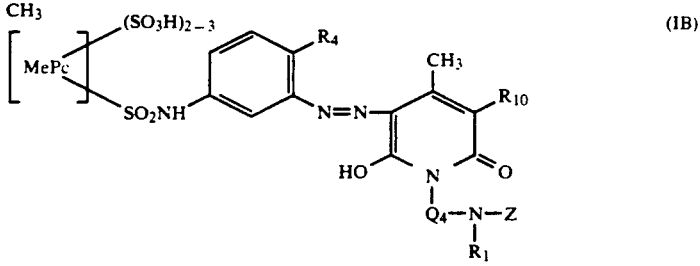

(IB)

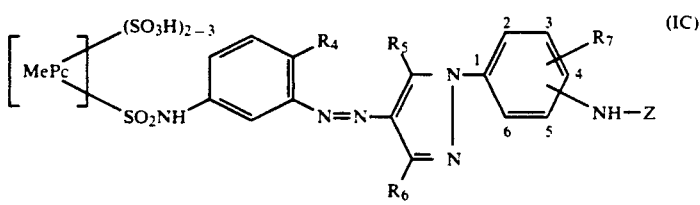

(IC)

may be prepared in which the symbols are as defined in Tables 2 and 3 below. The dyestuffs of Examples 12-50 give green dyeings on cotton which have high fixation yields and good fastnesses, such as good light and wet fastness properties. Compounds in which Me is nickel give particularly brilliant dyeings on cotton.

TABLE 2

| | | Compounds of formula IB | | |
|---|---|---|---|---|
| Ex. No. | Me | $R_4$ | $R_{10}$ | $-Q_4-NR_1-$ |
| 12 | Cu | H | H | $-(CH_2)_3N-$<br>$\quad\vert$<br>$\quad CH_3$ |
| 13 | Cu | $SO_3H$ | H | " |
| 14 | Cu | " | $-CONH_2$ | " |
| 15 | Cu | H | CN | " |
| 16 | Ni | H | H | " |
| 17 | Ni | H | $-\overset{\oplus}{N}\underset{}{\bigcirc}Cl^{\ominus}$ | " |
| 18 | Ni | H | $-CONH_2$ | " |
| 19 | Ni | $SO_3H$ | " | " |
| 20 | Ni | H | CN | " |
| 21 | Ni | $SO_3H$ | $-CONH_2$ | $-(CH_2)_2NH-$ |
| 22 | Ni | " | H | " |
| 23 | Cu | " | H | " |
| 24 | Ni | H | H | " |
| 25 | Cu | H | H | " |
| 26 | Ni | H | H | $-(CH_2)_2N\underset{}{\bigcirc}N-$ |
| 27 | Ni | $SO_3H$ | H | " |
| 28 | Ni | " | $-CONH_2$ | " |
| 29 | Ni | " | " | $-(CH_2)_3NH-$ |
| 30 | Cu | H | " | " |
| 31 | Ni | $SO_3H$ | H | " |

TABLE 2-continued

Compounds of formula IB

| Ex. No. | Me | R4 | R10 | —Q4—NR1— |
|---|---|---|---|---|
| 32 | Ni | " | H | —(CH2)2N—<br>\|<br>C2H5 |

TABLE 3

Compounds of formula IC

| Ex. No. | Me | R4 | R5 | R6 | R7 (in position) | position of —NH— |
|---|---|---|---|---|---|---|
| 33 | Cu | SO3H | OH | CH3 | H | 3 |
| 34 | Cu | H | OH | " | 2-SO3H | 5 |
| 35 | Cu | SO3H | OH | " | " | 5 |
| 36 | Cu | " | OH | —COOH | H | 3 |
| 37 | Cu | " | NH2 | CH3 | H | 3 |
| 38 | Ni | " | OH | " | H | 3 |
| 39 | Ni | H | OH | " | 2-SO3H | 5 |
| 40 | Ni | SO3H | OH | " | " | 5 |
| 41 | Ni | " | OH | —COOH | H | 4 |
| 42 | Ni | " | NH2 | CH3 | H | 3 |
| 43 | Ni | " | " | " | 2-SO3H | 5 |
| 44 | Ni | " | " | " | H | 4 |
| 45 | Ni | " | OH | —COOH | H | 3 |
| 46 | Ni | " | OH | CH3 | 2-SO3H | 4 |
| 47 | Ni | " | OH | " | H | 4 |
| 48 | Ni | H | OH | —COOH | H | 3 |
| 49 | Cu | H | OH | CH3 | H | 4 |
| 50 | Ni | H | OH | " | H | 3 |

EXAMPLES 51–58

Using a method analogous to that of Examples 1 to 2 and using appropriate starting materials, the following compounds of formula ID

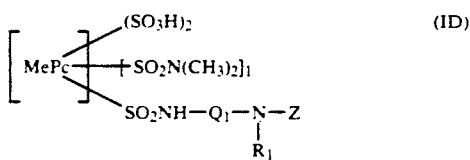

may be prepared in which the symbols are as defined in Table 4 below.

The shade of dyeing on cotton is given in the last column of Table 4 wherein bt is brilliant turquoise and
bg in bluish green.

These dyeings have good fastness properties.

TABLE 4

Compounds of formula ID

| Ex. No. | Me | —Q1—NR1— | shade on cotton |
|---|---|---|---|
| 51 | Cu | —CH2CH2NH— | bt |
| 52 | Ni | " | bg |
| 53 | Cu | —CH2CHNH—<br>\|<br>CH3 | bt |
| 54 | Ni | " | bg |
| 55 | Cu | —(CH2)3N—<br>\|<br>CH3 | bt |
| 56 | Ni | " | bg |
| 57 | Cu | —(CH2)2N⟨  ⟩N— | bt |
| 58 | Ni | " | bg |

EXAMPLE 59

Using a method analogous to that described in Example 11 and using appropriate starting compounds, the dyestuff of formula 59a

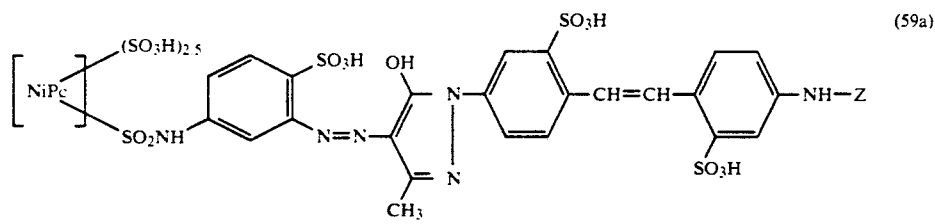

is prepared and isolated. Using this dyestuff, brilliant green cotton dyeings are obtained, which have good light and wet fastness properties.

The dyes of Examples 1 to 59 which are prepared in accordance with the method described above are obtained as sodium salts. They may, depending on the reaction/isolation conditions or by reacting the sodium salts in accordance with known methods, also be obtained in free acid form or in other salt forms, for example those salt forms containing one or more cations indicated in the description above.

The dyes of Examples 1 to 59 (and the corresponding free acids and other salt forms) are isomeric mixtures of
a) the compound in which in the group Z

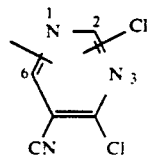

the floating chlorine substituent is located in the 2-position of the pyrimidine ring and the corresponding compound in which the chlorine substituent is located in the 6-position; and b) of the positional isomers which differ with respect to the position of all substituents of the phthalocyanine radical.

Each of the dyes of Examples 1–10 and 51–58 is a mixture of compounds that differ with respect to the values of c and d, the sum of c and d not exceeding 3. In the predominant components of the mixtures, c is 2 and d is 1, but the mixtures also contain as minor components compounds wherein c is other than 2 and d is other than 1, resulting in the average value of c of each mixture being about 2 and the average value of d of each mixture being about 1.

Each of the dyes of Examples 11–50 and 59 is a mixture of compounds that differ with respect to the value of a, the value of a not exceeding 3. In the predominant components of the mixtures a is 2 or 3, but the mixtures also contain as minor components compounds wherein a is other than 2 or 3, resulting in the average value of a of each mixture being between 2 and 3, inclusive, preferably about 2.5.

In general, it is preferred to use the mixtures of the dyestuffs of Examples 1 to 59, as such. Thus a separation into individual isomers is not necessary but if desired can be effected by conventional means.

In the following examples the application of the compounds according to the invention is illustrated.

APPLICATION EXAMPLE A

10 Parts of bleached cotton fabric are added to a dyebath which contains 0.3 part of the dyestuff of formula 1a (Example 1) and 15 parts of Glauber's salt (calcined) in 300 parts of demineralised water. The dyebath is maintained at a temperature of 40° for 30 minutes and subsequently during the addition at intervals of 10 minutes of a total of 6 parts of soda (calcined) in portions of 0.2, 0.6, 1.2 and 4 parts. Dyeing is continued at 40° for one hour. The dyed material is rinsed for 3 minutes under cold running water and for 3 minutes under hot running water and is then washed for 15 minutes in 500 parts of boiling demineralised water in the presence of 0.25 part of Marseille soap. The dyeing is again rinsed for 3 minutes under hot running water, spun and dried in a drying chamber at 70°. A brilliant turquoise cotton dyeing is obtained with good fastnesses. It has especially good light and wet fastness properties and is stable towards oxidation.

APPLICATION EXAMPLE B

10 Parts of bleached cotton material are added to a dyebath containing 10 parts of Glauber's salt (calcined) in 300 parts of demineralised water. The bath is heated to 40° over the course of 10 minutes, then 0.5 part of the dyestuff of formula 1a (Example 1) is added. After a further 30 minutes at 40°, 3 parts of soda (calcined) are added and dyeing is subsequently continued for 45 minute at 40°. The dyed material is rinsed, washed and dried according to the procedure given in Application Example A. A brilliant turquoise cotton dyeing is obtained, with similar to those of properties the dyeing obtained in Application Example A.

APPLICATION EXAMPLE C

Using the method of Application Example A, a cotton fabric is dyed in a dyebath of 0.3 part of the dyestuff of formula 11a (Example 11) with the addition of only 2 parts of soda (calcined) in one portion. The initial temperature of 40° is then increased to 60° and dyeing is continued for one hour at 60°. The dyed material is rinsed, washed and dried according to the procedure given in Application Example A. A brilliant green cotton dyeing with good build-up and especially good light fastness is obtained.

APPLICATION EXAMPLE D 2.5 Parts of the dyestuff of Example 5 are dissolved in 2000 parts of water. 100 parts of cotton fabric are added to the dyebath, and the temperature is maintained at 80° over a period of 10 minutes. 100 Parts of Glauber's salt (calcined) are added to the dyebath followed by the addition 30 minutes later of 20 parts of soda (calcined). Dyeing is continued for one hour at 80°. The dyed material is rinsed, washed and dried according to the procedure given in Application Example A. A brilliant turquoise dyeing with good fastness properties is obtained.

APPLICATION EXAMPLE E

A printing paste consisting of

| |
|---|
| 40 parts of the dyestuff of formula 1a or 11a |
| 100 parts of urea |
| 350 parts of water |
| 500 parts of a 4% sodium alginate thickener |
| 10 parts of sodium bicarbonate |
| 1000 parts in all | is applied to cotton material using a known printing process.

The printed material is then steamed for 4–8 minutes at 102°–104° and rinsed for 3 minutes under cold running water, then 3 minutes under hot running water. The fixed cotton material is subsequently washed and dried according to the procedure given in Application Example A. The brilliant turquoise (brilliant green) print has good all-round fastness properties.

Similarly, the dyestuffs of Examples 2 to 10 and 12 to 59 or a mixture of Examples 1 to 59 may be employed to dye or print cotton in accordance with the method given in Application Examples A to E. All dyeings and prints obtained show good fastness properties.

The dyeings and prints obtained with different dyestuffs are of the respective shades indicated in Examples 1 to 59.

What is claimed is:

1. A compound of the formula

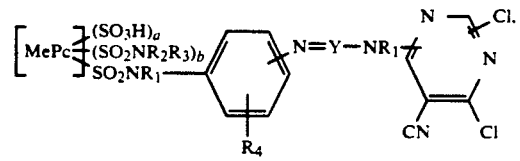

or a salt thereof,
or a mixture of such compounds or salts,
wherein
  Me is Cu, Ni, Co, Fe or Al,
  Pc is the phthalocyanine ring,
  each $R_2$ and $R_3$ is independently hydrogen or $C_{1-6}$alkyl, or
  —$NR_2R_3$ is a pyrrolidine, piperidine, piperazine or morpholine ring, R$_4$ is hydrogen, halo, hydroxy, C$_{1-4}$alkyl, C$_{1-4}$alkoxy, —COOH or —SO$_3$H, Y is

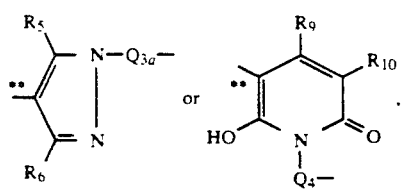 or 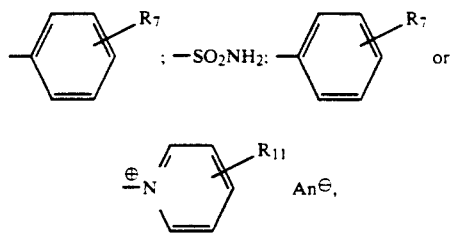

wherein

Q$_{3a}$ is

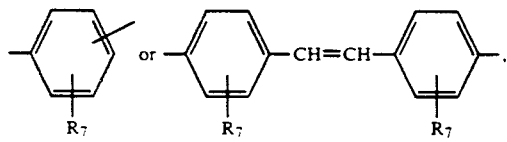

Q$_4$ is linear or branched C$_{2-6}$alkylene; linear or branched C$_{3-6}$alkylene monosubstituted by hydroxy; linear or branched C$_{2-6}$alkylene interrupted by one radical selected from —O— and —NR$_1$—;

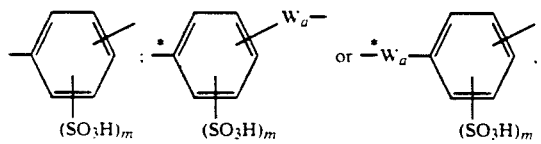

wherein

W$_a$ is linear or branched C$_{1-4}$alkylene, m is 0 or 1, and the * denotes the carbon atom attached to the nitrogen atom of the pyridone ring, or —Q$_4$—NR$_1$— is

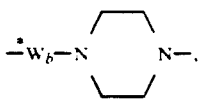

wherein

W$_b$ is linear or branched C$_{2-4}$-alkylene, and the * denotes the carbon atom attached to the nitrogen atom of the pyridone ring, R$_5$ is hydroxy or amino, R$_6$ is C$_{1-4}$alkyl or —COR$_8$, R$_9$ is hydrogen; C$_{1-4}$alkyl; C$_{5-6}$cycloalkyl; phenyl; phenyl substituted by 1 to 3 substituents selected from C$_{1-4}$alkyl, C$_{1-4}$-alkoxy, halo, —COOH and —SO$_3$H; phenyl-(C$_{1-4}$alkyl); phenyl(C$_{1-4}$alkyl) the phenyl ring of which is substituted by 1 to 3 substituents selected from C$_{1-4}$alkyl, C$_{1-4}$alkoxy, halo, —COOH and —SO$_3$H; —COR$_8$; —(CH$_2$)$_n$—SO$_3$H; —(CH$_2$)$_n$—OSO$_3$H or —(CH$_2$)$_n$—COR$_8$, wherein n is 1, 2, 3 or 4, R$_{10}$ is hydrogen; cyano; —SO$_3$H; —COR$_8$; C$_{1-4}$alkyl; C$_{1-4}$alkyl monosubstituted by hydroxy, halo, cyano, C$_{1-4}$alkoxy, —SO$_3$H, —OSO$_3$H, amino or wherein R$_{11}$ is hydrogen, C$_{1-4}$alkyl or C$_{2-4}$hydroxyalkyl, and An$\ominus$ is a non-chromophoric anion, and the ** denotes the carbon atoms to which the —N=N— radical is attached, a is 1, 2 or 3, and b is 0, 1 or 2, with the proviso that the sum of a and b is a maximum of 3, wherein each R$_1$ is independently hydrogen, C$_{1-4}$alkyl or C$_{1-4}$alkyl monosubstituted by hydroxy, halo, —SO$_3$H, —OSO$_3$H or —COOH, each R$_7$ is independently hydrogen, halo, C$_{1-4}$alkyl, C$_{1-4}$alkoxy, —COOH or —SO$_3$H, each R$_8$ is independently hydroxy, C$_{1-4}$alkoxy or amino, and each halo is independently fluoro, chloro or bromo.

2. A compound according to claim 1,
or a water-soluble salt thereof each cation of which is independently a non-chromophoric cation,
or a mixture of such compounds or water-soluble salts.

3. A compound according to claim 2,
or a water-soluble salt thereof each cation of which is independently a non-chromophoric cation,
or a mixture of such compounds or water-soluble salts,
wherein Me is Cu or Ni.

4. A compound according to claim 2,
or a water-soluble salt thereof each cation of which is independently a non-chromophoric cation,
or a mixture of such compounds or water-soluble salts,
wherein each R$_1$ is independently hydrogen or methyl.

5. A compound according to claim 2,
or a water-soluble salt thereof each cation of which is independently a non-chromophoric cation,
or a mixture of such compounds or water-soluble salts,
wherein each R$_2$ and R$_3$ is independently hydrogen, methyl or ethyl.

6. A compound according to claim 2,
or a water-soluble salt thereof each cation of which is independently a non-chromophoric cation,
or a mixture of such compounds or water-soluble salts,
wherein Q$_4$ is linear or branched C$_{2-4}$alkylene, linear or branched C$_{3-4}$alkylene monosubstituted by hydroxy,

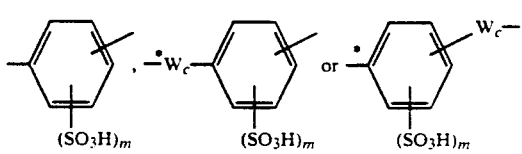

wherein

W$_c$ is linear or branched C$_{1-2}$alkylene, m is 0 or 1, and the * denotes the carbon atom attached to the nitrogen atom of the pyridone ring, —Q$_4$—NR$_1$— is

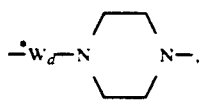

wherein

W$_d$ is linear or branched C$_{2-3}$alkylene and the * denotes the carbon atom attached to the nitrogen atom of the pyridine ring, R$_4$ is hydrogen, methyl, ethoxy, —COOH or —SO$_3$H, and R$_6$ is methyl, —COOH or —CONH$_2$, R$_9$ is hydrogen, methyl, ethyl, phenyl, —COR$_{8a}$, —CH$_2$SO$_3$H or —CH$_2$OSO$_3$H, and R$_{10}$ is hydrogen, cyano, —SO$_3$H, —COR$_{8a}$ or —CH$_2$SO$_3$H, wherein each R$_{8a}$ is independently hydroxy or amino.

7. A compound according to claim 2 having the formula

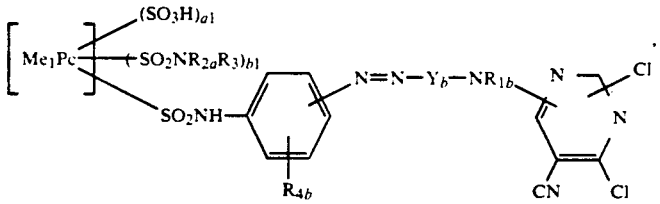

or a water-soluble salt thereof each cation of which is independently a non-chromophoric cation, or a mixture of such compounds or water-soluble salts, wherein Me$_1$ is Cu or Ni, Pc is the phthalocyanine ring, R$_{1b}$ is hydrogen, methyl, ethyl or 2-hydroxyethyl, each R$_{2a}$ and R$_{3a}$ is independently hydrogen or C$_{1-4}$alkyl, or —NR$_{2a}$R$_{3a}$ is pyrrolidino, piperidino, morpholino or piperazino, R$_{4b}$ is hydrogen, —COOH or —SO$_3$H, Y$_b$ is

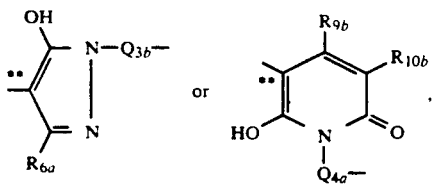

wherein

Q$_{3b}$ is

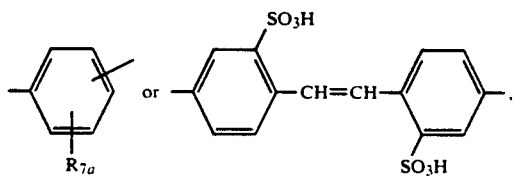

wherein

R$_{7a}$ is hydrogen, chloro, methyl, methoxy, —COOH or —SO$_3$H,

Q$_{4a}$ is linear or branched C$_{2-4}$alkylene, linear or branched C$_{3-4}$alkylene monosubstituted by hydroxy,

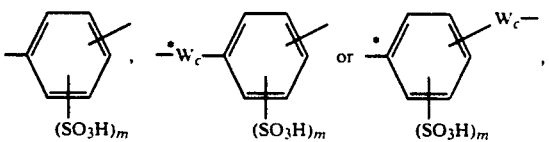

wherein

W$_c$ is linear or branched C$_{1-2}$alkylene, the * denotes the carbon atom attached to the nitrogen atom of the pyridone ring, and m is 0 or 1, or

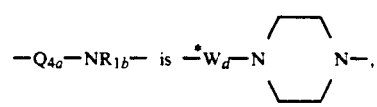

wherein

W$_d$ is linear or branched C$_{2-3}$alkylene and the * denotes the carbon atom attached to the nitrogen atom of the pyridone ring, R$_{6a}$ is methyl, —COOH or —CONH$_2$, R$_{9b}$ is methyl or ethyl, R$_{10b}$ is hydrogen or —CONH$_2$, and the ** denotes the carbon atom to which the —N=N— radical is attached, a1 is 2 or 3, and b1 is 0 or 1, with the proviso that the sum of a1 and b1 is a maximum of 3.

8. A compound according to claim 7, or a water-soluble salt thereof each cation of which is independently a non-chromophoric cation, or a mixture of such compounds or water-soluble salts, wherein b1 is 0.

9. A compound of the formula

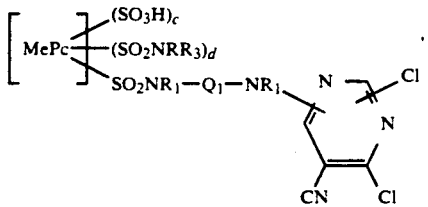

or a salt thereof, or a mixture of such compounds or salts, wherein

Me is Cu, Ni, Co, Fe or Al,

Pc is the phthalocyanine ring, $Q_1$ is linear or branched $C_{2-6}$alkylene; linear or branched $C_{3-6}$alkylene monosubstituted by hydroxy; linear or branched $C_{2-6}$alkylene interrupted by one radical selected from —O— and —$NR_1$—;

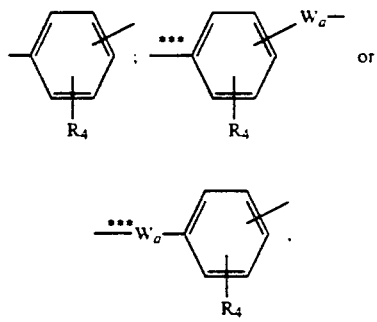

wherein
is hydrogen, halo, hydroxy, $C_{1-4}$alkyl, $C_{1-4}$alkoxy, —COOH or —$SO_3H$,
$W_a$ is linear or branched $C_{1-4}$alkylene, and
the *** denotes the carbon atom attached to the —$SO_2NR_1$— radical, or
—$NR_1$—$Q_1$—$NR_1$— is

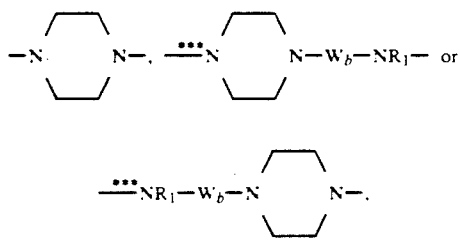

wherein
$W_b$ is linear or branched $C_{2-4}$alkylene, an
the *** denotes the nitrogen atom attached to the —$SO_2$— radical.
R is $C_{1-6}$alkyl, and
$R_3$ is hydrogen or $C_{1-6}$alkyl, or
—$NRR_3$ is a pyrrolidine, piperidine, piperazine or morpholine ring,
c is 1 or 2, and
d is 1 or 2, with the proviso that the sum of c and d is a maximum of 3,
wherein
each $R_1$ is independently hydrogen, $C_{1-4}$alkyl or $C_{1-4}$alkyl monosubstituted by hydroxy, halo, —$SO_3H$, —$OSO_3H$ or —COOH, and
each halo is independently fluoro, chloro or bromo.

10. A compound according to claim 9,
or a water-soluble salt thereof each cation of which is independently a non-chromophoric cation,
or a mixture of such compounds or water-soluble salts.

11. A compound according to claim 10,
or a water-soluble salt thereof each cation of which is independently a non-chromophoric cation,
or a mixture of such compounds or water-soluble salts,
wherein Me is Cu or Ni.

12. A compound according to claim 10,
or a water-soluble salt thereof each cation of which is independently a non-chromophoric cation,
or a mixture of such compounds or water-soluble salts,
wherein each $R_1$ is independently hydrogen or methyl.

13. A compound according to claim 10,
or a water-soluble salt thereof each cation of which is independently a non-chromophoric cation,
or a mixture of such compounds or water-soluble salts,
wherein
R is methyl or ethyl, and
$R_3$ is hydrogen, methyl or ethyl.

14. A compound according to claim 10,
or a water-soluble salt thereof each cation of which is independently a non-chromophoric cation,
or a mixture of such compounds or water-soluble salts,
wherein
$Q_1$ is linear or branched $C_{2-3}$alkylene, linear or branched $C_{3-4}$alkylene monosubstituted by hydroxy, —$W_d$—O—$W_d$—, —$W_d$—$NR_{1b}$—$W_d$—,

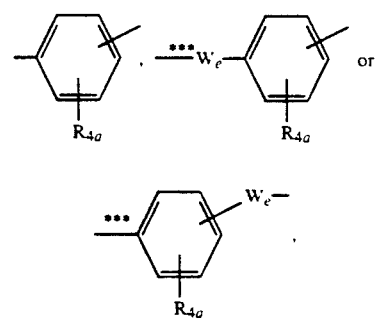

wherein
$R_{1b}$ is hydrogen, methyl, ethyl or 2-hydroxyethyl,
$R_{4a}$ is hydrogen, methyl, methoxy, —COOH or —$SO_3H$,
$W_e$ is linear or branched $C_{1-3}$alkylene, and
the *** denotes the carbon atom attached to the —$SO_2NR_1$— radical, or
—$NR_1$—$Q_1$—$NR_1$—

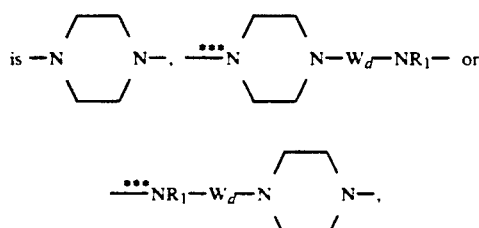

wherein the *** denotes the nitrogen atom attached to the —$SO_2$— radical,
wherein each $W_d$ is independently linear or branched $C_{2-3}$alkylene.

15. A compound according to claim 10 having the formula

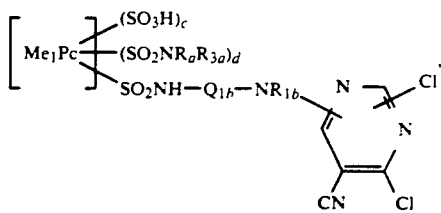

or a water-soluble salt thereof each cation of which is independently a non-chromophoric cation,
or a mixture of such compounds or water-soluble salts, wherein
$Me_1$ is Cu or Ni,
Pc is the phthalocyanine ring,
$Q_{1b}$ is linear or branched $C_{2-3}$alkylene, linear or branched $C_{3-4}$alkylene monosubstituted by hydroxy,

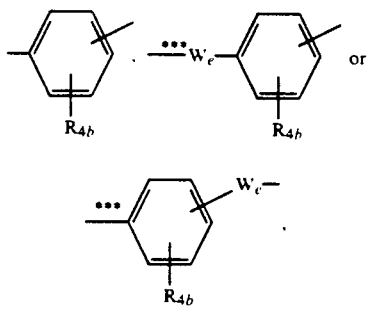

wherein
$R_{4b}$ is hydrogen, —COOH or —$SO_3H$,
$W_e$ is linear or branched $C_{1-3}$alkylene, and
the *** denotes the carbon atom attached to the —$SO_2NH$— radical, or
—NH—$Q_{1b}$—$NR_{1b}$— is

$R_a$ is $C_{1-4}$alkyl,
$R_{3a}$ is hydrogen or $C_{1-4}$alkyl, or
—$NR_aR_{3a}$ is pyrrolidino, piperidino, morpholino or piperazino,
$R_{1b}$ is hydrogen, methyl, ethyl or 2-hydroxyethyl,
c is 1 or 2, and
d is 1 or 2, with the proviso that the sum of c and d is a maximum of 3.

16. A compound according to claim 15,
or a water-soluble salt thereof each cation of which is independently a non-chromophoric cation,
or a mixture of such compounds or water-soluble salts, wherein d is 1.

17. A compound according to claim 15,
or a water-soluble salt thereof each cation of which is independently a non-chromophoric cation,
or a mixture of such compounds or water-soluble salts, wherein
$R_a$ is methyl or ethyl, and
$R_{3a}$ is hydrogen, methyl or ethyl.

18. A compound according to claim 15,
or a water-soluble salt thereof each cation of which is independently a non-chromophoric cation,
or a mixture of such compounds or water-soluble salts, wherein $R_{1b}$ is hydrogen or methyl.

19. A compound according to claim 15,
or a water-soluble salt thereof each cation of which is independently a non-chromophoric cation,
or a mixture of such compounds or water-soluble salts, wherein
$Q_{1b}$ is linear or branched $C_{2-3}$alkylene, linear or branched $C_{3-4}$alkylene monosubstituted by hydroxy or

—NH—$Q_{1b}$—$NR_{1b}$— is

20. A compound according to claim 19,
or a water-soluble salt thereof each cation of which is independently a non-chromophoric cation,
or a mixture of such compounds or water-soluble salts, wherein $Q_{1b}$ is linear or branched $C_{2-3}$alkylene or linear or branched $C_{3-4}$alkylene monosubstituted by hydroxy.

21. A compound according to claim 20,
or a water-soluble salt thereof each cation of which is independently a non-chromophoric cation,
or a mixture of such compounds or water-soluble salts, wherein $Me_1$ is copper.

* * * * *